(12) United States Patent
Bufe et al.

(10) Patent No.: US 9,424,298 B2
(45) Date of Patent: *Aug. 23, 2016

(54) PRESERVING CONCEPTUAL DISTANCE WITHIN UNSTRUCTURED DOCUMENTS

(71) Applicant: International Business Machines Corporation, Armonk, NY (US)

(72) Inventors: John P. Bufe, Washington, DC (US); Timothy P. Winkler, Clinton, MA (US)

(73) Assignee: International Business Machines Corporation, Armonk, NY (US)

(*) Notice: Subject to any disclaimer, the term of this patent is extended or adjusted under 35 U.S.C. 154(b) by 134 days.

This patent is subject to a terminal disclaimer.

(21) Appl. No.: 14/508,200

(22) Filed: Oct. 7, 2014

(65) Prior Publication Data

US 2016/0098379 A1 Apr. 7, 2016

(51) Int. Cl.
G06F 17/00 (2006.01)
G06F 17/30 (2006.01)
G06F 17/28 (2006.01)
G06F 17/27 (2006.01)

(52) U.S. Cl.
CPC ........ G06F 17/30336 (2013.01); G06F 17/278 (2013.01); G06F 17/2785 (2013.01); G06F 17/2795 (2013.01); G06F 17/28 (2013.01); G06F 17/30011 (2013.01)

(58) Field of Classification Search
CPC .................................................... G06F 17/28
See application file for complete search history.

(56) References Cited

U.S. PATENT DOCUMENTS

| 6,453,315 | B1* | 9/2002 | Weissman | G06F 17/30672 |
| 6,766,316 | B2* | 7/2004 | Caudill | G06F 17/3069 |
| 7,027,974 | B1* | 4/2006 | Busch | G06F 17/271 704/4 |
| 7,113,943 | B2* | 9/2006 | Bradford | G06F 17/30687 707/739 |
| 7,571,177 | B2 | 8/2009 | Damle | |
| 7,827,125 | B1* | 11/2010 | Rennison | G06F 17/3066 706/14 |

(Continued)

FOREIGN PATENT DOCUMENTS

CN 101021838 A 8/2007

OTHER PUBLICATIONS

A. Kalogeratos et al., Text document clustering using global term context vectors, Knowledge and Information Systems, Jun. 2012, vol. 31, Issue 3, pp. 455-474.

(Continued)

*Primary Examiner* — Laurie Ries
(74) *Attorney, Agent, or Firm* — Terrile, Cannatti, Chambers & Holland, LLP; Stephen A. Terrile (57) ABSTRACT

A method, system and computer-usable medium are disclosed for preserving conceptual distance within unstructured documents by characterizing conceptual relationships. Natural language processing is applied to content in a plurality of documents to identify topics and subjects. Analytic analysis is then applied to the identified topics and subjects to identify concepts. The content in each of the plurality of documents is partitioned into a first structured hierarchy, preserving at least one structure in each document inherent in the each document. Access is then provided to the content through a first index based upon utilizing the first structured hierarchy and through a second index utilizing a second structured hierarchy. The conceptual relationship criteria are based upon a directed graph with weights based upon a similarity and a distance based upon concepts.

12 Claims, 5 Drawing Sheets

(56) References Cited

U.S. PATENT DOCUMENTS

| | | | | |
|---|---|---|---|---|
| 8,620,909 | B1 | 12/2013 | Rennison | |
| 9,189,749 | B2* | 11/2015 | Estes | G06N 5/022 |
| 9,235,630 | B1* | 1/2016 | Dietrich | G06F 17/30572 |
| 2003/0101182 | A1* | 5/2003 | Govrin | G06F 17/30613 |
| 2003/0217335 | A1* | 11/2003 | Chung | G06F 17/2785 |
| | | | | 715/206 |
| 2004/0024739 | A1* | 2/2004 | Copperman | G06F 17/30616 |
| 2004/0093328 | A1* | 5/2004 | Damle | G06F 17/2785 |
| 2004/0230577 | A1* | 11/2004 | Kawatani | G06F 17/3071 |
| 2005/0108200 | A1* | 5/2005 | Meik | G06F 17/3071 |
| 2005/0165600 | A1* | 7/2005 | Kasravi | G06F 17/2211 |
| | | | | 704/9 |
| 2005/0203924 | A1* | 9/2005 | Rosenberg | G06F 17/30969 |
| 2006/0047673 | A1* | 3/2006 | Molander | G06F 17/30126 |
| 2006/0167930 | A1* | 7/2006 | Witwer | G06F 17/3071 |
| 2006/0242190 | A1* | 10/2006 | Wnek | G06F 17/30734 |
| 2007/0011183 | A1* | 1/2007 | Langseth | G06F 17/30616 |
| 2008/0091427 | A1* | 4/2008 | Olsen | G10L 15/197 |
| | | | | 704/254 |
| 2009/0327259 | A1* | 12/2009 | Smith | G06F 17/30713 |
| 2010/0274752 | A1* | 10/2010 | Moises Gonzalez | G06F 17/274 |
| | | | | 706/50 |
| 2011/0015921 | A1* | 1/2011 | Kuruvilla | G06F 17/3071 |
| | | | | 704/9 |
| 2011/0320186 | A1* | 12/2011 | Butters | G06F 17/30672 |
| | | | | 704/9 |
| 2012/0066210 | A1* | 3/2012 | Mukerjee | G06F 17/30713 |
| | | | | 707/723 |
| 2012/0066217 | A1* | 3/2012 | Eder | G06F 17/30864 |
| | | | | 707/723 |
| 2012/0158860 | A1* | 6/2012 | Chakra | H04L 51/28 |
| | | | | 709/206 |
| 2012/0209847 | A1* | 8/2012 | Rangan | G06F 17/3069 |
| | | | | 707/737 |
| 2012/0296637 | A1* | 11/2012 | Smiley | G06K 9/6201 |
| | | | | 704/9 |
| 2012/0323968 | A1* | 12/2012 | Yih | G06F 17/30613 |
| | | | | 707/780 |
| 2013/0218905 | A1* | 8/2013 | Sankarasubramaniam | G06F 17/30828 |
| | | | | 707/748 |

OTHER PUBLICATIONS

C.K. Cheng et al., Using Perception in Managing Unstructured Documents, Magazine Crossroads, vol. 10, Issue 2, pp. 5-5, Dec. 2003, http://eil.stanford.edu/xpan/challenge.html.

A. Boubacar et al., Concept Based Information Retrieval, International Journal of Engineering Sciences & Research Technology, Aug. 2013, http://www.ijesrt.com/issues%20pdf%20file/Archives%202013/august-2013/15.pdf.

R. High, "The Era of Cognitive Systems: An Inside Look at IBM Watson and How it Works," IBM Redbooks, 2012, pp. 1-15.

Yuan et al., "Watson and Healthcare," IBM developerWorks, 2011, pp. 1-9.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717, pp. 1-5.

List of IBM Patents or Applications Treated as Related.

* cited by examiner

PRESERVING CONCEPTUAL DISTANCE WITHIN UNSTRUCTURED DOCUMENTS

BACKGROUND OF THE INVENTION

1. Field of the Invention

The present invention relates in general to the field of computers and similar technologies, and in particular to software utilized in this field. Still more particularly, it relates to a method, system and computer-usable medium for preserving conceptual distance within unstructured documents.

2. Description of the Related Art

Many unstructured documents have an inherent hierarchy that implicitly transfers information throughout the document. However, processing such documents as a flat file typically loses conceptual distance and information inherited from sections that are higher in the hierarchy. For example, the text alignment of a document with a title and three consecutive sections would result a textual distance value of '1', '2' and '3' between the title and the first, second and third sections. However, the conceptual distance value between the title and each of the three sections would be '1', as each of the sections is conceptually related to the title. Additionally, textual alignment fails to take into account conceptual similarities of linked passages to other documents, or sections of documents, which would likewise have a conceptual distance value of '1' from the title of the original document. While such passages may be linked through a hyperlink, this data is typically lost or stripped out by most parsers.

Furthermore, many passage similarity metrics currently use textual distance instead of distance between passages, which incorrectly scores passages at the end of a document as less relevant than those that are near the beginning. Moreover, when someone attempts to use a passage, they are generally confined to only seeing what is in the passage itself as inherited conceptual information from parent sections and headers is unavailable, which reduces relevance and informativeness. Other known approaches to this issue include table of content (TOC) generators, which can parse the markup of a single annotated document into a tree structure. However, such approaches do not allow for conceptual cycles, maintaining inter-document relationships, or the implementation of more sophisticated partitioning algorithms.

Another issue related to conceptual distance is determining how to split a training corpus into different entities, such as terms, documents, concepts, and so forth. Current distributional semantic methods, such as latent semantic analysis (LSA) and random indexing, use a static definition of what each of these entities should be. The definitions are then used to generate a matrix, which in turn is converted into a vector-space model using techniques such as singular value decomposition (SVD). Certain methods, such as LSA, use a term-document matrix in which documents are collections of text and terms are some subset of that text. This methodology finds inherent similarities in terms by their contexts within documents. However, the definitions they use can affect the relevance and usefulness of the generated model. Furthermore, many vector space models suffer from improper document length, providing too little or too much information, and words matching or not matching the appropriate values in the model. These models also treat documents as a collection of words and therefore lose sentence context information.

SUMMARY OF THE INVENTION

A method, system and computer-usable medium are disclosed for preserving conceptual distance within unstructured documents. In various embodiments, the content of a plurality of documents is characterized by conceptual relationships. In these embodiments, natural language processing (NLP) is applied to the content to identify topics and subjects. In turn, analytic analysis is applied to the identified topics and subjects to identify concepts. The content in each of the plurality of documents is partitioned into a first structured hierarchy, preserving at least one structure in each document inherent in the each document. Access is then provided to the content through a first index based upon utilizing the first structured hierarchy and through a second index utilizing a second structured hierarchy. In various embodiments, the conceptual relationships are based upon a directed graph with weights based upon a similarity and a distance based upon concepts. In certain embodiments, the distance is based upon a topic hierarchy.

In various embodiments, the content is characterized by optimizing a vector space model representation of the documents. In certain embodiments, the optimization is performed by a system capable of answering questions. In these embodiments, the content from the plurality of documents is first ingested by the system, followed by applying NLP to the content to identify terms, topics, subjects and concepts. The content is partitioned according to a semantic parse distance to identify a context for partitioned content. In turn, a vector space model is implemented to represent the content and context. Entries in the vector space model are then eliminated based, upon a difference criteria, followed by the application of an iterative genetic algorithm optimize features of the vector space model.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for preserving conceptual distance within unstructured documents. The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
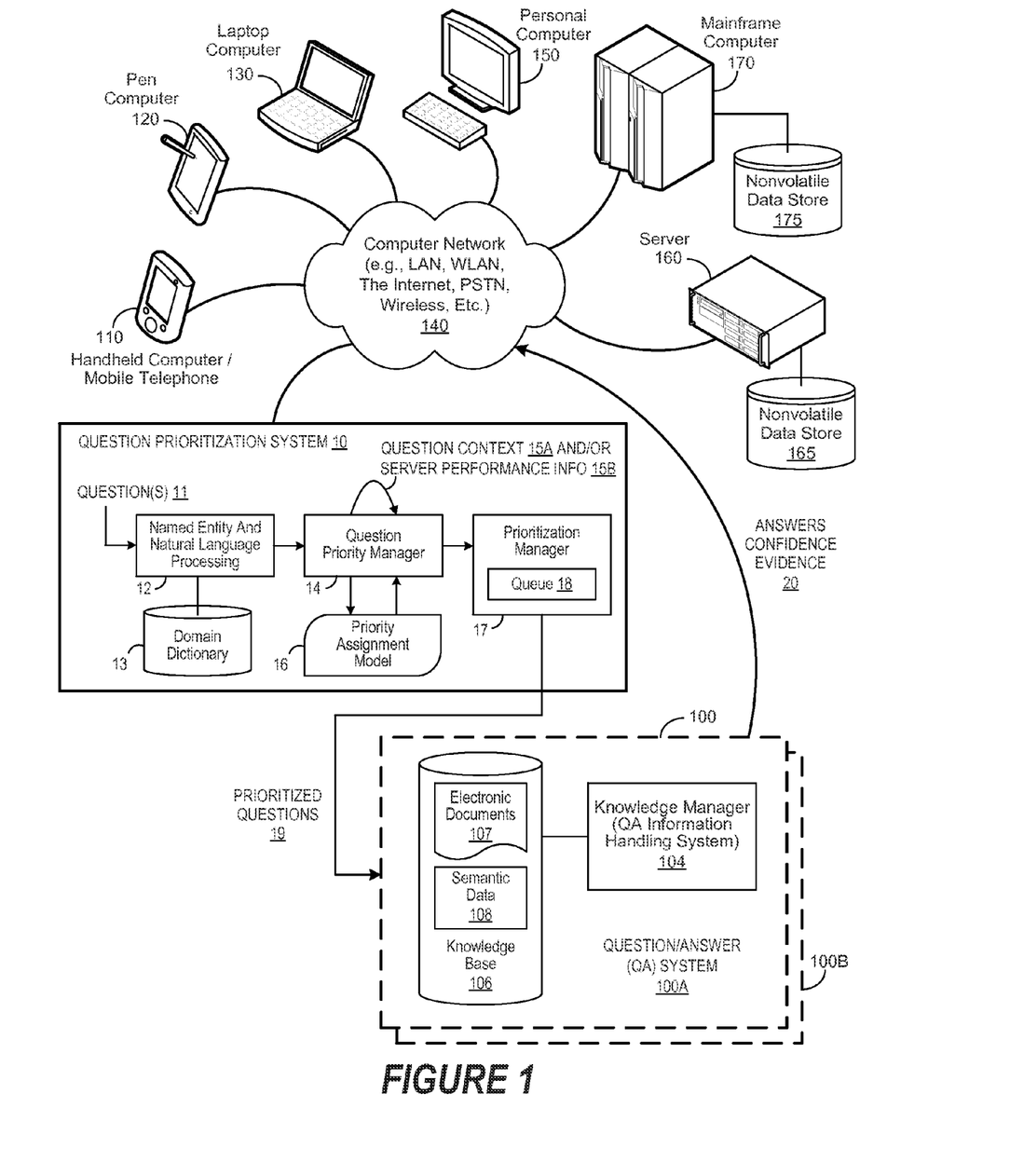
FIG. 1 depicts an exemplary client computer in which the present invention may be implemented.

FIG. 1 depicts a schematic diagram of one illustrative embodiment of a question prioritization system 10 and question/answer (QA) system 100 connected to a computer network 140. The QA system 100 includes a knowledge manager 104 that is connected to a knowledge base 106 and configured to provide question/answer (QA) generation functionality for one or more content users who submit across the network 140 to the QA system 100. To assist with efficient sorting and presentation of questions to the QA system 100, the prioritization system 10 may be connected to the computer network 140 to receive user questions, and may include a plurality of subsystems which interact with cognitive systems, like the knowledge manager 100, to prioritize questions or requests being submitted to the knowledge manager 100.

The Named Entity subsystem 12 receives and processes each question 11 by using natural language (NL) processing to analyze each question and extract question topic information contained in the question, such as named entities, phrases, urgent terms, and/or other specified terms which are stored in one or more domain entity dictionaries 13. By leveraging a plurality of pluggable domain dictionaries relating to different domains or areas (e.g., travel, healthcare, electronics, game shows, financial services), the domain dictionary 11 enables critical and urgent words (e.g., "threat level") from different domains (e.g., "travel") to be identified in each question based on their presence in the domain dictionary 11. To this end, the Named Entity subsystem 12 may use a Natural Language Processing (NLP) routine to identify the question topic information in each question. As used herein, "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 13.

The Question Priority Manager subsystem 14 performs additional processing on each question to extract question context information 15A. In addition or in the alternative, the Question Priority Manager subsystem 14 may also extract server performance information 15B for the question prioritization system 10 and/or QA system 100. In selected embodiments, the extracted question context information 15A may include data that identifies the user context and location when the question was submitted or received. For example, the extracted question context information 5A may include data that identifies the user who submitted the question (e.g., through login credentials), the device or computer which sent the question, the channel over which the question was submitted, the location of the user or device that sent the question, any special interest location indicator (e.g., hospital, public-safety answering point, etc.), or other context-related data for the question. The Question Priority Manager subsystem 14 may also determine or extract selected server performance data 15B for the processing of each question. In selected embodiments, the server performance information 15B may include operational metric data relating to the available processing resources at the question prioritization system 10 and/or QA system 100, such as operational or run-time data, CPU utilization data, available disk space data, bandwidth utilization data, etc. As part of the extracted information 15A/B, the Question Priority Manager subsystem 14 may identify the SLA or QoS processing requirements that apply to the question being analyzed, the history of analysis and feedback for the question or submitting user, and the like. Using the question topic information and extracted question context and/or server performance information, the Question Priority Manager subsystem 14 is configured to populate feature values for the Priority Assignment Model 16 which provides a machine learning predictive model for generating a target priority values for the question, such as by using an artificial intelligence (AI) rule-based logic to determine and assign a question urgency value to each question for purposes of prioritizing the response processing of each question by the QA system 100.

The Prioritization Manager subsystem 17 performs additional sort or rank processing to organize the received questions based on at least the associated target priority values such that high priority questions are put to the front of a prioritized question queue 18 for output as prioritized questions 19. In the question queue 18 of the Prioritization Manager subsystem 17, the highest priority question is placed at the front for delivery to the assigned QA system 100. In selected embodiments, the prioritized questions 19 from the Prioritization Manager subsystem 17 that have a specified target priority value may be assigned to a specific pipeline (e.g., QA System 100A) in the QA system cluster 100. As will be appreciated, the Prioritization Manager subsystem 17 may use the question queue 18 as a message queue to provide an asynchronous communications protocol for delivering prioritized questions 19 to the QA system 100 such that the Prioritization Manager subsystem 17 and QA system 100 do not need to interact with a question queue 18 at the same time by storing prioritized questions in the question queue 18 until the QA system 100 retrieves them. In this way, a wider asynchronous network supports the passing of prioritized questions as messages between different computer systems 100A, 100B, connecting multiple applications and multiple operating systems. Messages can also be passed from queue to queue in order for a message to reach the ultimate desired recipient. An example of a commercial implementation of such messaging software is IBM's WebSphere MQ (previously MQ Series). In selected embodiments, the organizational function of the Prioritization Manager subsystem 17 may be configured to convert over-subscribing questions into asynchronous responses, even if they were asked in a synchronized fashion.

The QA system 100 may include one or more QA system pipelines 100A, 100B, each of which includes a computing device 104 (comprising one or more processors and one or more memories, and potentially any other computing device elements generally known in the art including buses, storage devices, communication interfaces, and the like) for processing questions received over the network 140 from one or more users at computing devices (e.g., 110, 120, 130) connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable question/answer (QA) generation functionality for one or more content users. Other embodiments of QA system 100 may be used with components, systems, sub-systems, and/or devices other than those that are depicted herein.

In each QA system pipeline 100A, 100B, a prioritized question 19 is received and prioritized for processing to generate an answer 20. In sequence, prioritized questions 19 are dequeued from the shared question queue 18, from which they are dequeued by the pipeline instances for processing in priority order rather than insertion order. In selected embodiments, the question queue 18 may be implemented based on a "priority heap" data structure. During processing within a QA system pipeline (e.g., 100A), questions may be split into many subtasks which run concurrently. A single pipeline instance can process a number of questions concurrently, but only a certain number of subtasks. In addition, each QA system pipeline may include a prioritized queue (not shown) to manage the processing order of these subtasks, with the top-level priority corresponding to the time that the corresponding question started (earliest has highest priority). However, it will be appreciated that such internal prioritization within each QA system pipeline may be augmented by the external target priority values generated for each question by the Question Priority Manager subsystem 14 to take precedence or ranking priority over the question start time. In this way, more important or higher priority questions can "fast track" through the QA system pipeline if it is busy with already-running questions.

In the QA system 100, the knowledge manager 104 may be configured to receive inputs from various sources. For example, knowledge manager 104 may receive input from the question prioritization system 10, network 140, a knowledge base or corpus of electronic documents 106 or other data, a content creator 108, content users, and other possible sources of input. In selected embodiments, some or all of the inputs to knowledge manager 104 may be routed through the network 140 and/or the question prioritization system 10. The various computing devices (e.g., 110, 120, 130, 150, 160, 170) on the network 140 may include access points for content creators and content users. Some of the computing devices may include devices for a database storing the corpus of data as the body of information used by the knowledge manager 104 to generate answers to cases. The network 140 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 104. The document 106 may include any file, text, article, or source of data (e.g., scholarly articles, dictionary definitions, encyclopedia references, and the like) for use in knowledge manager 104. Content users may access knowledge manager 104 via a network connection or an Internet connection to the network 140, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 19 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information processing systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information processing systems include pen, or tablet, computer 120, laptop, or notebook, computer 130, personal computer system 150, and server 160. As shown, the various information processing systems can be networked together using computer network 140. Types of computer network 140 that can be used to interconnect the various information processing systems include Local Area Networks (LANs), Wireless Local Area Networks (WLANs), the Internet, the Public Switched Telephone Network (PSTN), other wireless networks, and any other network topology that can be used to interconnect the information processing systems. Many of the information processing systems include nonvolatile data stores, such as hard drives and/or nonvolatile memory. Some of the information processing systems may use separate nonvolatile data stores (e.g., server 160 utilizes nonvolatile data store 165, and mainframe computer 170 utilizes nonvolatile data store 175). The nonvolatile data store can be a component that is external to the various information processing systems or can be internal to one of the information processing systems. An illustrative example of an information processing system showing an exemplary processor and various components commonly accessed by the processor is shown in FIG. 2.

Figure 2:
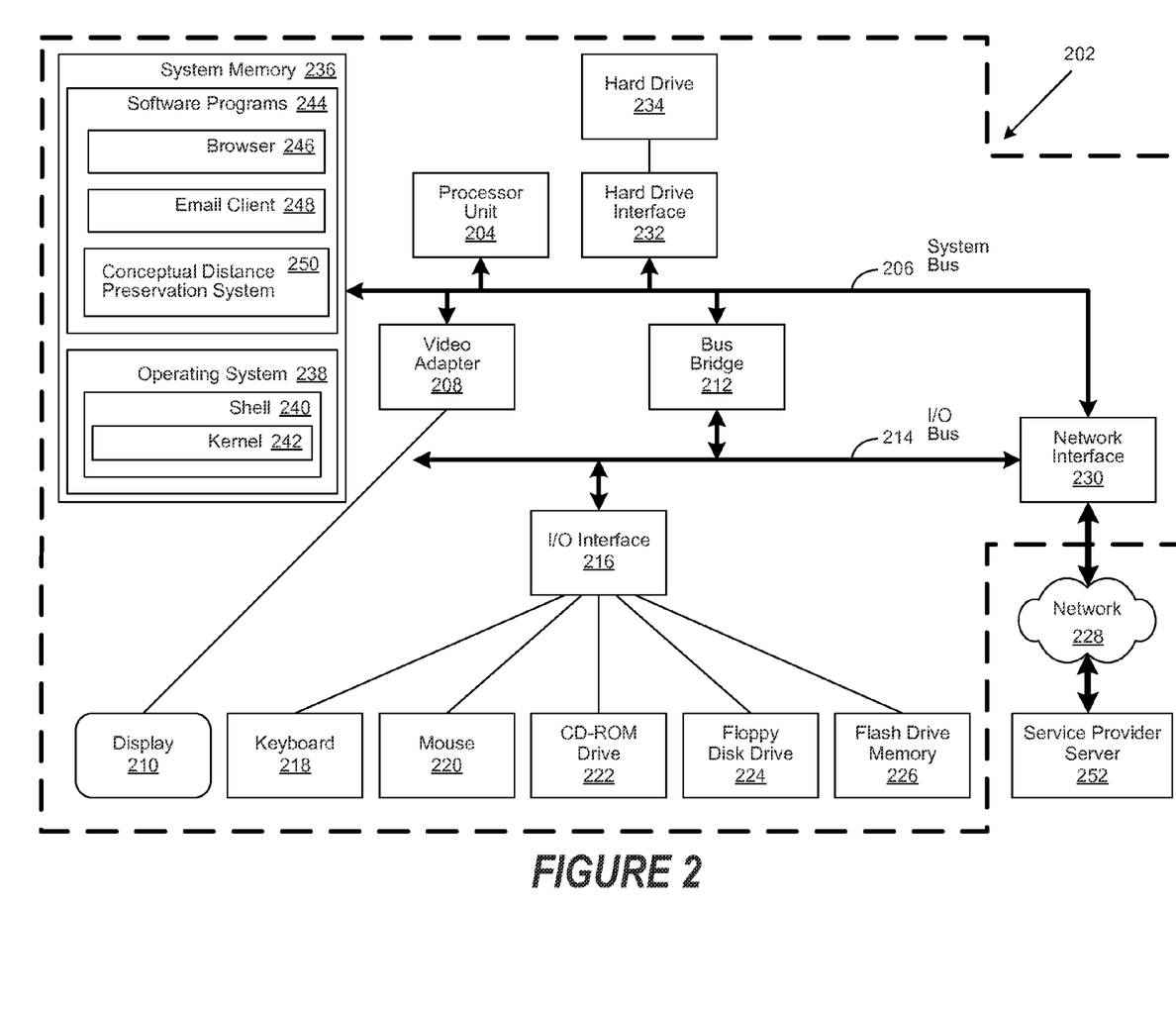
FIG. 2 is a simplified block diagram of an information handling system capable of performing computing operations

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk—Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, software programs 244 may also include a conceptual distance preservation system 250. In these and other embodiments, the conceptual distance preservation system 250 includes code for implementing the processes described hereinbelow. In one embodiment, information processing system 202 is able to download the conceptual distance preservation system 250 from a service provider server 252.

The hardware elements depicted in the information processing system 202 are not intended to be exhaustive, but rather are representative to highlight components used by the present invention. For instance, the information processing system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
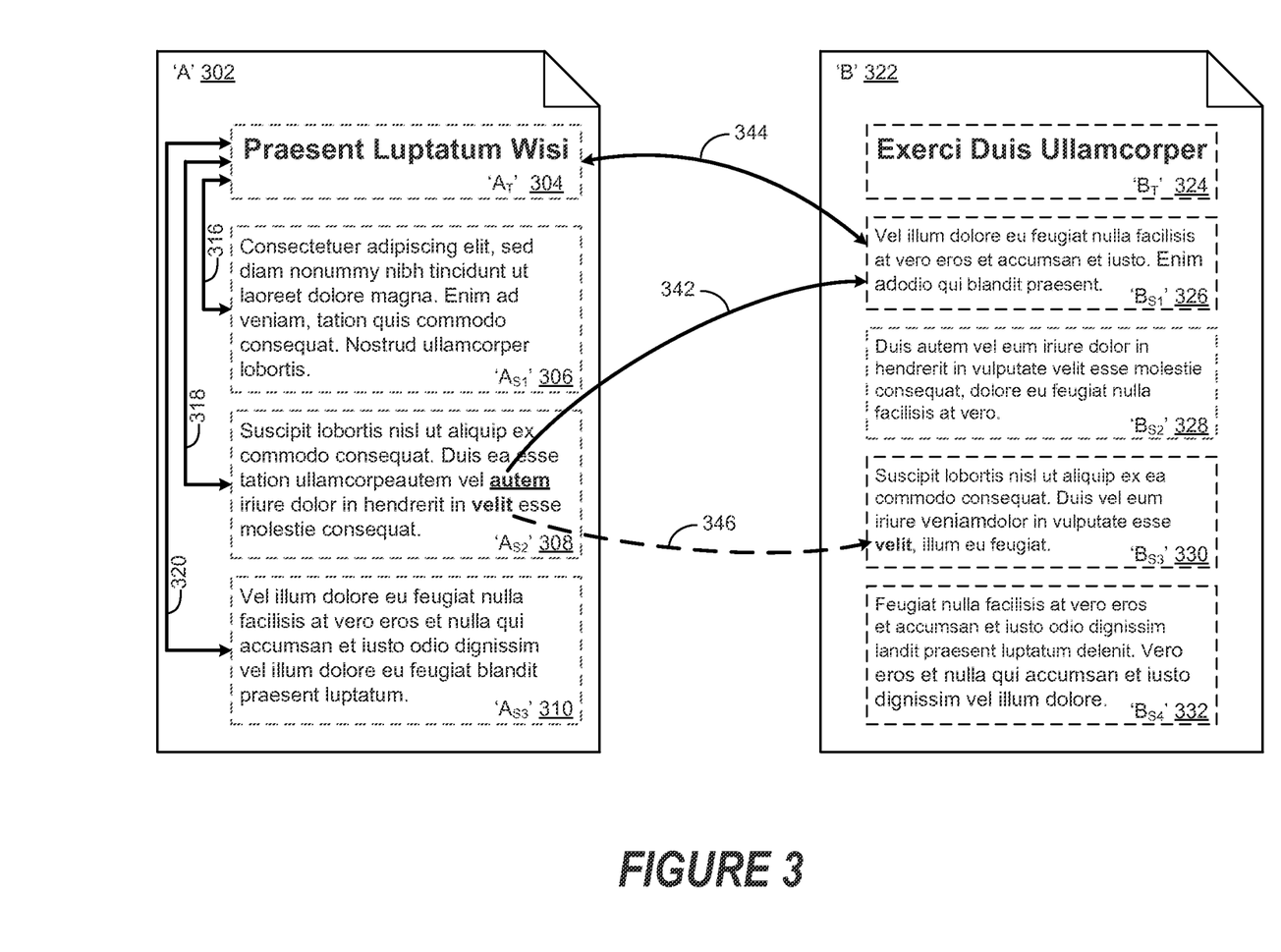
FIG. 3 depicts a corpus of unstructured documents implemented to preserve conceptual distance.

FIG. 3 depicts a corpus of unstructured documents implemented in accordance with an embodiment of the invention to preserve conceptual distance. In various embodiments, a topical graph is generated from a corpus of unstructured documents, such as unstructured documents 'A' 302 and 'B' 304. In these embodiments, the resulting topical graph preserves conceptual distance between various partitions of a document and to partitions in other documents, as well as inheriting information from parent sections and headers.

As used herein, conceptual distance broadly refers to a measure of how closely two concepts are related (i.e., a conceptual relationship between the concepts). As such, the ability to quantify the conceptual distance between two concepts assists in determining how similar, or different, they may be. Skilled practitioners of the arts will be aware that current approaches to determining conceptual distance include the use of query terms, also known as document relevance. However, such approaches do not compare the terms or concepts themselves to determine how close they are and which are closest to one another.

In various embodiments, the conceptual distance information provided by the topic graph can be used for passage search and scoring. For example, passage searching is improved by the ability to find links to other documents and by including more contextual information through inheritance. Passage scoring is likewise improved by increased alignment and relevance through inherited information. In various embodiments, clarifying and descriptive features are attached to terms and documents when generating a matrix, which in turn is used for generating vector-space models. In these embodiments, a machine learning method is then used to learn which features are important for producing a trustworthy model. In certain embodiments, the resulting model is measured to create a reference standard for how closely different entities should be related.

In this embodiment, the corpus includes unstructured documents 'A' 302 and 'B' 304, which respectively have a title '$A_T$' 304 and '$B_T$' 324. As shown in FIG. 3, unstructured document 'A' 302 has sections '$A_{S1}$' 306, '$A_{S2}$' 308, and '$A_{S3}$' 310, while unstructured document 'B' 322 has sections '$B_{S1}$' 326, '$B_{S2}$' 328, '$B_{S3}$' 330 and '$B_{S4}$' 332. As likewise shown in FIG. 3, the distance relationship between title '$A_T$' 304 and sections $A_{S1}$ 306, '$A_{S2}$' 308, and '$A_{S3}$' 310 within unstructured document 'A' 302 is respectively represented by distance metrics 316, 318, and 320.

Skilled practitioners of the art will recognize that the distance metrics 316, 318, and 320 respectively represent progressively lower textual distance values between title '$A_T$'

304 and sections '$A_{S1}$' 306, '$A_{S2}$' 308, and '$A_{S3}$' 310. However, the distance metrics 316, 318, and 320 respectively represent the same conceptual distance weight value between title '$A_T$' 304 and sections '$A_{S1}$' 306, '$A_{S2}$' 308, and '$A_{S3}$' 310. Likewise, as shown in FIG. 3, section '$A_{S2}$' 308 in unstructured document 'A' 302 is linked 342 to section '$B_{S1}$' 326 of unstructured document 'B' 322. Those of skill in the art will likewise realize that the textual distance weight value represented by distance metric 344 between title '$A_T$' 304 and section '$B_{S1}$' 326 is lower than the conceptual distance weight value between title '$A_T$' 304 and section '$B_{S1}$' 326 when sections '$A_{S2}$' 308 and '$B_{S1}$' 326 are synonymous.

As an example, title '$A_T$' 304 of unstructured document 'A' 302 may be "Notable Mustangs from the Muscle Car Era," with sections '$A_{S1}$' 306, '$A_{S2}$' 308, and '$A_{S1}$' 310 respectively containing content related to the "1964 289 V8," "1968 390 fastback," and "1970 Boss 302 Mustang" models. To continue the example, section '$B_{S1}$' 326 may contain information regarding various options available for the "1968 390 fastback" Mustang model. As a result, since the content contained in sections '$A_{S1}$' 306 and '$B_{S1}$' 326 are synonymous, the conceptual distance weight value represented by the distance metric 344 between title '$A_T$' 304 and section '$B_{S1}$' 326 is higher than the corresponding textual distance value.

In various embodiments, preserving conceptual distance between titles (e.g., title '$A_T$' 304) and sections within the same document (e.g., sections '$A_{S1}$' 306, '$A_{S2}$' 308, and '$A_{S3}$'), and sections in linked documents (e.g., section '$B_{S1}$' 326) is begun by first selecting a target corpus of files. In these and other embodiments, the target corpus of files is selected from a set of one or more flat files that have been generated by processing one or more unstructured documents, such as unstructured documents 'A' 302 and 'B' 304.

In various embodiments, known sentence boundary disambiguation (SBD) approaches are then used to break the target corpus of files into individual sentences. Skilled practitioners of the art will be familiar with SBD, also known as sentence breaking, which addresses the challenge in natural language processing (NLP) of determining where sentences begin and end. In particular, many NLP tools require their input to be divided into sentences because punctuation marks are often ambiguous. For example, a period may not denote the end of a sentence, but instead an abbreviation, a decimal point, an ellipsis, or an email address. Furthermore, question marks, exclamation marks, and other punctuation may appear in embedded quotations, emoticons, computer code, and slang. The particular method of SBD used to parse the target corpus of files into individual sentences is a matter of design choice.

Contiguous sentences resulting from the preceding operations are then grouped into documents. In various embodiments, the grouping is performed using a predetermined, uniform document length. The method by which the uniform document length is determined is a matter of design choice. In certain embodiments, as described in greater detail herein, conceptual distance is preserved in the resulting documents by inheriting information from parent sections (e.g., titles '$A_T$' 304 and '$B_T$' 324). It will be appreciated that the preservation of conceptual distance is advantageous when the resulting documents are large. It will likewise be appreciated that various iterations of the grouping operations may require the method of grouping to be modified. The method by which the method of grouping is modified is a matter of design choice.

The documents resulting from the preceding operations are then processed to generate associated metadata. In various embodiments, the associated metadata may include the number of sentences, the number of paragraphs, the number of text segments larger than a paragraph (e.g., a section), the number of topics, the number of terms, or some combination thereof. In certain embodiments, the method by which the topics are extracted, and the number of terms that are extracted, is a matter of design choice.

The metadata generated in the preceding operations is then respectively associated with its corresponding document. Each of these documents is then parsed to generate a corresponding parse tree. In certain embodiments, a parser such as XSG, available from International Business Machines, of Armonk, N.Y., or StanfordNLP, is used to perform the parsing. The method by which each document is parsed is a matter of design choice. Named entities are then identified within each document and merged into its corresponding parse tree. As used herein, named-entity identification, also known as named entity recognition (NER), entity chunking, and entity extraction, broadly refers to an aspect of information extraction that seeks to locate and classify elements in text into pre-defined categories such as the names of persons, organizations, locations, expressions of times, quantities, monetary values, percentages, and so forth. The method by which the named entities are identified and merged into the parse trees is a matter of design choice.

Synsets are identified and resolved for nodes within each parse tree. As used herein, a synset, also known as a synonym set or synonym ring, broadly refers to a set of one or more synonyms that are interchangeable in some context without changing the truth value of the proposition in which they are embedded. Accordingly, a synset likewise refers to a group of data elements that are considered semantically equivalent for the purposes of information retrieval. Skilled practitioners of the art will be aware that such data elements are frequently found in various metadata registries, which store the synonyms at a central location referred to as the preferred data element.

In various embodiments, the synsets are identified and resolved through the implementation of an external resource, such as Wordnet. Those of skill in the art will likewise be familiar with WordNet, which is a lexical database for the English language. WordNet groups English words into synsets, provides short definitions and usage examples, and records a number of relations among these sets of synonyms or their respective members. As such, WordNet can be considered a combination of dictionary and thesaurus that is accessible for use by automated text analysis and artificial intelligence applications, or alternatively, by human users via a web browser. The method by which the synsets are identified and resolved is a matter of design choice.

Terms are then identified as nodes in each parse tree, along with associated distinguishing factors, such as its part of speech, lemma, and synset. As used herein a term refers to words and compound words whose meaning is dependent upon the context in which they are used. The identified terms are then used to generate a term-document matrix. As used herein, a term-document matrix, also known as a document-term matrix, refers to a mathematical matrix that describes the frequency of terms that occur in a collection of documents, such as unstructured documents 'A' 302 and 'B' 304. In various embodiments, the distinguishing factors of the previously-identified terms are used in counting operations to generate the term-document matrix. In certain embodiments, inter-term counts are added, using inverted parse tree distance to maintain the relevance of contextual co-occurrences. In these embodiments, each cell in the term-document matrix will have the number of occurrences of the term in that document. In various embodiments, the document list includes an entry for each term to account for co-occurrences.

In certain embodiments, a genetic algorithm is implemented to optimize various features and values to determine an optimal term-document matrix generation method. As used herein, a genetic algorithm refers to a search heuristic that mimics the process of natural selection. This heuristic, also known as a metaheuristic, is commonly used to generate solutions to optimization and search problems. Those of skill in the art will be aware that genetic algorithms belong to the larger class of evolutionary algorithms, which generate solutions to optimization problems using techniques inspired by natural evolution, such as inheritance, mutation, selection, and crossover. In certain embodiments, the genetic algorithm is implemented to manipulate various values for additional term-document matrix generation iterations. In these embodiments, the various values may include which entity features are ingested and processed when generating a space vector model, the weighting of semantic distance, high and low threshold values for pruning (i.e., eliminating) rows and columns, or some combination thereof.

The term-document matrix is then cleaned. In various embodiments, the cleaning of the term-document includes ensuring that the sum of any row does not exceed a predetermined maximum threshold number of stop words, does not fall below a predetermined minimum threshold number of terms that have no impact, or a combination of the two. In certain embodiments, the cleaning includes removing any columns having more than a maximum, or less than a minimum, number of values. In various embodiments, duplicate columns are identified and only one is retained.

The cleaned term-document matrix is then ingested and processed to generate a vector space model. As used herein, a vector space model, also known as a term vector model, refers to an algebraic model for representing text documents, or objects in general, as vectors of identifiers, such as index terms. Skilled practitioners of the art will be familiar with various uses for vector space models, such as information filtering, retrieval and indexing, as well as for relevancy rankings. In various embodiments, singular value decomposition (SVD) approaches know to those of skill in the art are used to generate the vector space model. As used herein, singular value decomposition (SVD) refers to a factorization of a real or complex matrix in linear algebra, which is often useful in statistics. The method by which the vector space model is generated is a matter of design choice.

In various embodiments, term and entity features are used for grouping and disambiguation during the ingestion and processing of the term-document matrix. In certain embodiments, semantic parse distance is used for weighting and providing context during the ingestion and processing of the term-document matrix. In various embodiments, predetermined threshold values are used to determine rows and columns that are inappropriate for a vector space model and should be removed from the term-document matrix during its ingestion and processing. The resulting vector space model is then tested against a known reference vector space model, followed by the implementation of a learning algorithm to optimize the vector space model. In various embodiments, the implementation of the learning algorithm optimizes term and document features. In certain embodiments, the implementation of the learning algorithm optimizes low and high thresholds for term and document pruning. In these embodiments, the implementation of the learning algorithm will determine which features should be used, and what level the thresholds should be set to, which in turn can be extrapolated to other systems. The selection of the learning algorithm that is used, and the method by which it is used, is a matter of design choice.

In various embodiments, the "ground truth" implemented by the learning algorithm includes various clusters of terms, with each cluster having a minimum similarity threshold for each pair-wise comparison of members within the cluster. Likewise, each cluster has an expected range of similarity values between members and outside values for each outside cluster. In certain embodiments, for evaluation of a given model, the k-squared means is on all distances from the expected values with the lower score being a better value. As used herein, "ground truth" refers to the accuracy of a training set's classification for supervised learning techniques, which are often used in statistical models to prove or disprove research hypotheses. The method by which the ground truth is implemented is a matter of design choice.

The corpus of documents (e.g., unstructured documents 'A' 302 and 'B' 304) are then partitioned. In various embodiments, the documents in the corpus are partitioned using existing markup or annotation information available in the document. In certain embodiments, the documents in the corpus are partitioned using natural language processing (NLP). In these embodiments, the resulting partitions maintain hierarchical information that is inherent to their associated documents. The method by which the documents in the corpus are partitioned is a matter of design choice, and may include various document partitioning approaches known to those of skill in the art.

The partition hierarchy information associated with the documents is then processed to generate a directed graph. As used herein, a directed graph refers to a graph, or set of nodes connected by edges, where the edges have a direction associated with them. Each edge of the directed graph is then associated with a predetermined weight and type, as described in greater detail herein. In one embodiment, a predetermined conceptual distance weight value is associated with each edge of the directed graph that is shared by a parent section and a sub-section.

As an example, the distance between title '$A_T$' 304 and sections '$A_{S1}$' 306, '$A_{S2}$' 308, and '$A_{S3}$' 310 may be considered conceptually close. As a result, the corresponding distance metrics 316, 318, and 320 may all be assigned a conceptual distance weight value of '0.9', making each of each of the sections '$A_{S1}$' 306, '$A_{S2}$' 308, and '$A_{S1}$' 310 weighted equally against the title '$A_T$' 304. In another embodiment, a predetermined conceptual distance weight value is associated with each edge of the directed graph that is shared by a predetermined section in a first document and a predetermined section in a second document.

To continue the preceding example, section '$A_{S2}$' 308 in unstructured document 'A' 302 is linked 342 to section '$B_{S1}$' 326 of unstructured document 'B' 322. Those of skill in the art will realize that such a link 342 typically implies synonymous concepts. Accordingly, section '$B_{S1}$' 326 may effectively be a conceptual expansion of the content contained in section '$A_{S2}$' 308, similar to an acronym expansion. As a result, a weighted edge between the title '$A_T$' 304 and section '$B_{S1}$' 326, represented by distance metric 344, may be assigned a conceptual distance weight value of '0.9', thereby giving it equal weight against sections '$A_{S1}$' 306, '$A_{S2}$' 308, and '$A_{S3}$' 310.

In yet another embodiment, a predetermined conceptual distance weight value is associated with each edge of the directed graph that is shared by sub-sections (e.g., sections '$A_{S1}$' 306, '$A_{S2}$' 308, and '$A_{S3}$' 310) in a document that share the same parent section (e.g., title '$A_T$' 304). In various embodiments, the document (e.g., unstructured documents 'A' 302 and 'B' 304) does not have to be partitioned by sub-section. In these embodiments, any partitioning scheme may be used, such as words, sentences, some sub-tree of a grammar phrase, and so forth.

Likewise, section 'A$_{S2}$' 308 and section 'B$_{S3}$' 330 of document 'B' 304 may have an identical word or phrase that are not linked 346. Accordingly, the two identical words or phrases can be assumed to be related, but perhaps not as closely as the two previous examples. As a result, an edge can be established between them with a conceptual distance weight value of '0.5'. Likewise, if the related concepts are not identical, but only synonymous and not identical, and found in section 'A$_{S2}$' 308 and section 'B$_{S3}$' 330, the conceptual distance weight may have a value of '0.2'. In various embodiments, conceptual distance weight values are adjusted further, based upon issues like ambiguity. Skilled practitioners of the art will realize that many such embodiments are possible and the foregoing is not intended to limit the spirit, scope or intent of the invention.

The corpus of documents is then searched for passages. In various embodiments, initial passages are found through the implementation of search indexes familiar to those of skill in the art. In these embodiments, the indexes for each passage may include contextualized information gained through inheritance to improve initial passage search results. In certain embodiments, additional passages are found and weighted, based upon their conceptual distance from the initial passages that were found. In various embodiments, the search results are improved by using the conceptual distance of the additional passages to find passages in other documents.

Alignment and relevance scores are then used, as described in greater detail herein, to score the passages, based upon a predetermined question and its corresponding answer. As an example, given a search term 'R' that matches title 'A$_T$' 304, conceptual distance weight values of '1.0' are returned for 'A$_T$' 304, '0.9', '0.9' for A$_{S1}$' 306, '0.9' for 'A$_{S2}$' 308, '0.9' for 'A$_{S3}$' 310, '0.9' for 'B$_{S1}$' 326, '0.5' for 'B$_{S3}$' 330, and '0.2' for 'B$_{S4}$' 332. In certain embodiments, this weighted index is adjusted with incremental updates to the corpus. In certain embodiments, the alignment and relevance scores for small child sections are improved through the use of inherited information resulting from the various conceptual distance operations described in greater detail herein.

Figure 4:
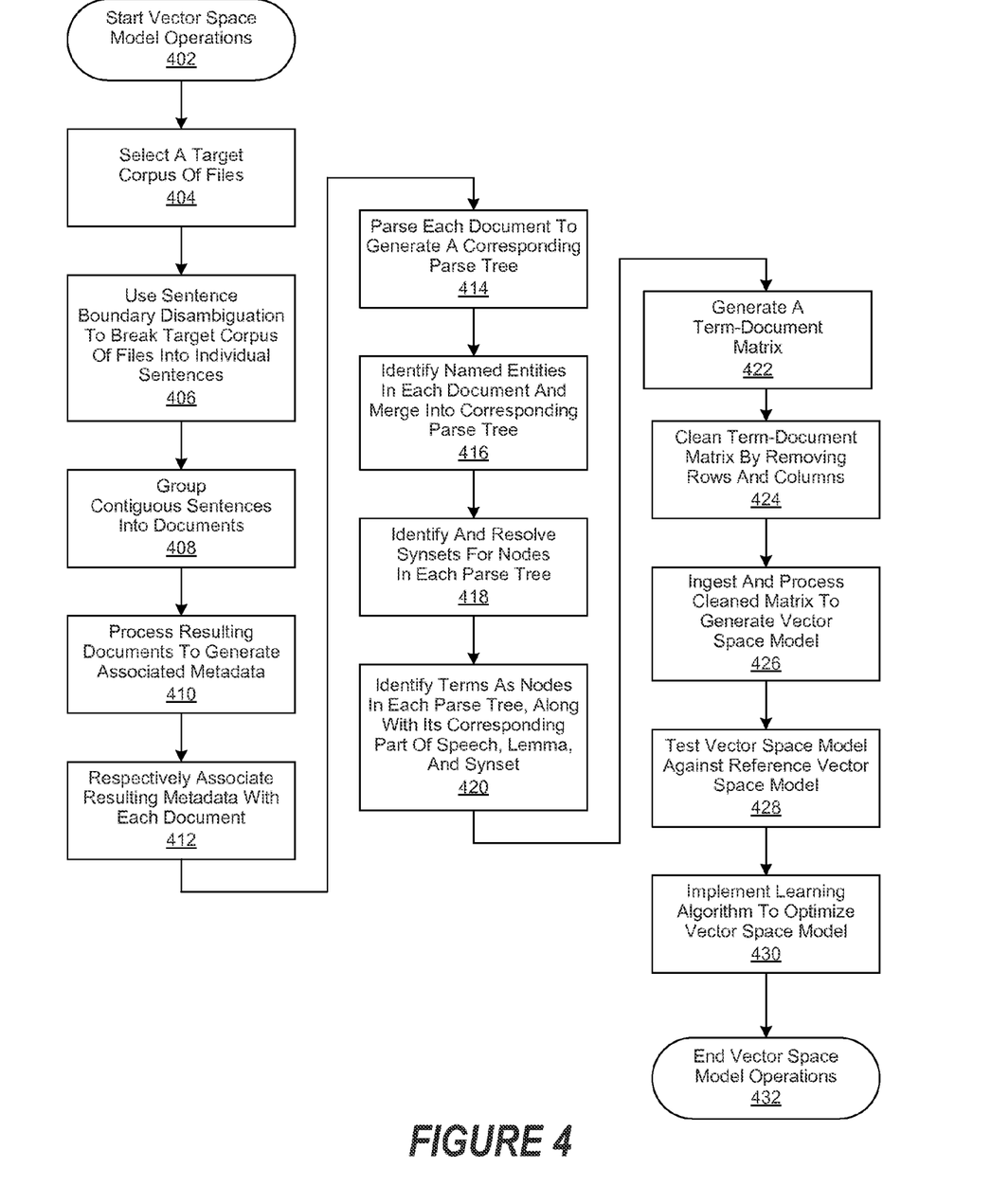
FIG. 4 is a generalized flowchart of the performance of vector space model operations.

FIG. 4 is a generalized flowchart of vector space model operations performed in accordance with an embodiment of the invention. In this embodiment, vector space model operations are begun in step 402, followed by the selection of a target corpus of files in step 404. In various embodiments, the target corpus of files is selected from a set of one or more flat files that have been generated by processing one or more unstructured documents.

Known sentence boundary disambiguation (SBD) approaches are then used in step 406 to break the target corpus of files into individual sentences. Contiguous sentences resulting from the operations performed in step 406 are then grouped into documents in step 408. In various embodiments, the grouping is performed using a predetermined, uniform document length. In certain embodiments, as described in greater detail herein, conceptual distance is preserved in the resulting documents by inheriting information from parent sections.

The documents resulting from the operations performed in step 408 are then processed to generate associated metadata. In various embodiments, the associated metadata may include the number of sentences, the number of paragraphs, the number of text segments larger than a paragraph (e.g., a section), the number of topics, the number of terms, or some combination thereof. In certain embodiments, the method by which the topics are extracted, and the number of terms that are extracted, is a matter of design choice. The metadata generated in step 410 is then respectively associated with its corresponding document in step 412. Then, in step 414, each document is parsed to generate a corresponding parse tree. Named entities are then identified within each document and merged into its corresponding parse tree in step 414.

Then in step 418, synsets are identified and resolved for nodes in each parse tree. In various embodiments, the synsets are identified and resolved through the implementation of an external resource, such as WordNet. Terms are then identified in step 420 as nodes in each parse tree, along with associated distinguishing factors, such as its part of speech, lemma, and synset. The terms identified in step 420 are then used in step 422 to generate a term-document matrix. In various embodiments, the distinguishing factors of the terms identified in step 420 are used in counting operations to generate the term-document matrix. In certain embodiments, inter-term counts are added, using inverted parse tree distance to maintain the relevance of contextual co-occurrences. In these embodiments, each cell in the term-document matrix will have the number of occurrences of the term in that document. In various embodiments, the document list includes an entry for each term to account for co-occurrences.

In certain embodiments, a genetic algorithm is implemented to optimize various features and values to determine an optimal term-document matrix generation method. In various embodiments, the genetic algorithm is implemented to manipulate various values for additional term-document matrix generation iterations. In these embodiments, the various values may include which entity features are ingested and processed when generating a space vector model, the weighting of semantic distance, high and low threshold values for pruning (i.e., eliminating) rows and columns, or some combination thereof.

The term-document matrix is then cleaned in step 424. In various embodiments, the cleaning of the term-document includes ensuring that the sum of any row is set to not exceed a predetermined maximum threshold number of stop words, and is likewise set to not fall below a predetermined minimum threshold number of terms that have no impact. In certain embodiments, the cleaning includes removing any columns having more than a maximum, or less than a minimum, number of values. In various embodiments, duplicate columns are identified and only one is retained.

The cleaned term-document matrix is then ingested and processed in step 426 to generate a vector space model. In various embodiments, term and entity features are used for grouping and disambiguation during the ingestion and processing of the term-document matrix. In certain embodiments, semantic parse distance is used for weighting and providing context during the ingestion and processing of the term-document matrix. In various embodiments, predetermined threshold values are used to remove rows and columns from the term-document matrix during its ingestion and processing that are determined to be inappropriate for a vector space model.

The resulting vector space model is then tested against a known reference vector space model in step 428, followed by the implementation of a learning algorithm to optimize the vector space model. In various embodiments, the implementation of the learning algorithm optimizes term and document features. In certain embodiments, the implementation of the learning algorithm optimizes low and high thresholds for term and document pruning (i.e., eliminating). In these embodiments, the implementation of the learning algorithm will determine which features should be used, and what level the thresholds should be set to, which in turn can be extrapolated to other systems.

In various embodiments, the ground truth implemented by the learning algorithm includes various clusters of terms, with each cluster having a minimum similarity threshold for each pair-wise comparison of members within the cluster. Likewise, each cluster has an expected range of similarity values between members and outside values for each outside cluster. In certain embodiments, for evaluation of a given model, the k-squared means is on all distances from the expected values with the lower score being a better value. Vector space model operations are then ended in step 432.

Figure 5:
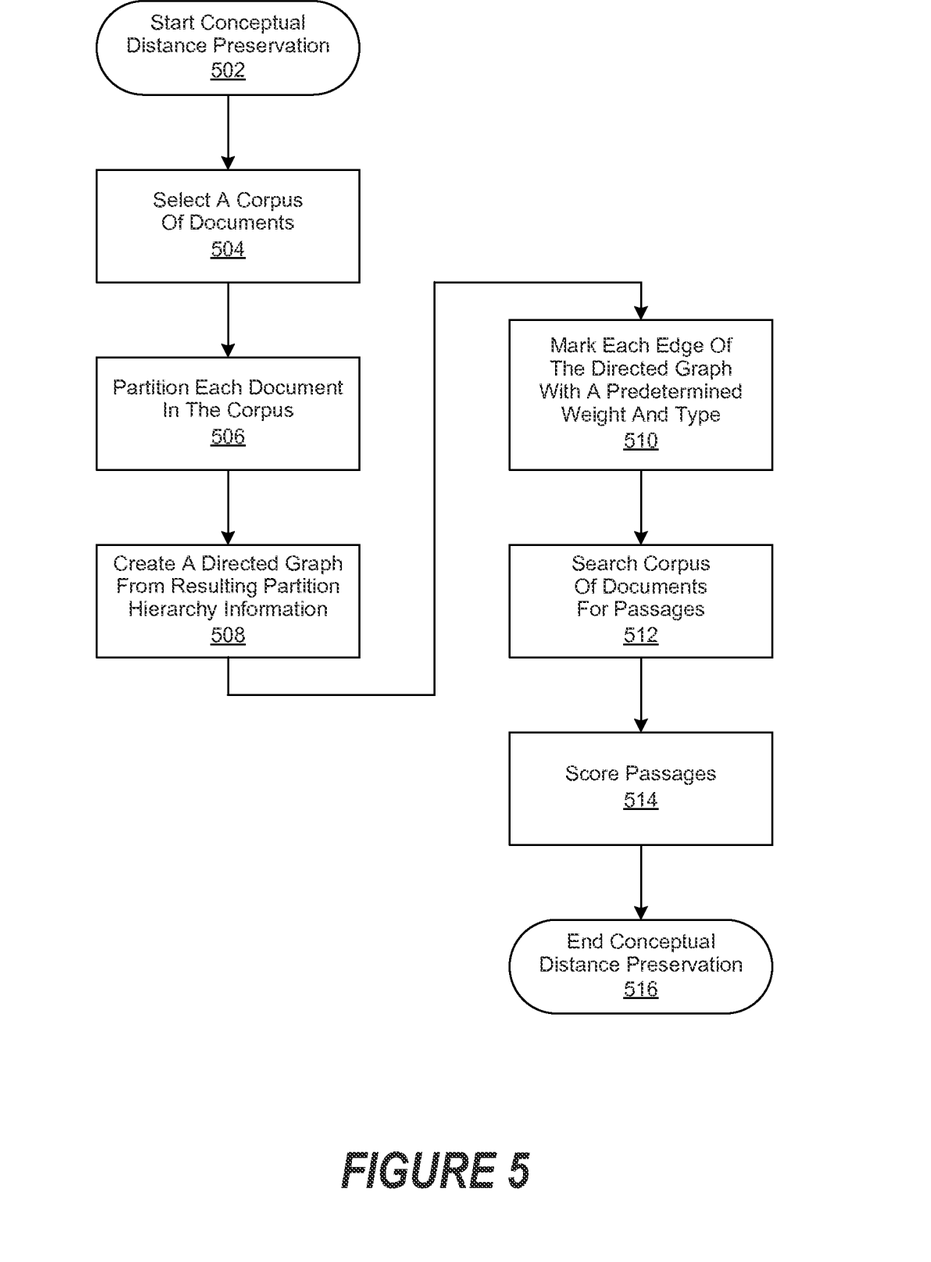
FIG. 5 is a generalized flowchart of the performance of conceptual distance preservation operations.

FIG. 5 is a generalized flowchart of conceptual distance preservation operations performed in accordance with an embodiment of the invention. In this embodiment, conceptual distance preservation operations are begun in step 502, followed by the selection of a corpus of documents in step 504, which are in turn partitioned in step 506. In various embodiments, the documents in the corpus are partitioned using existing markup or annotation information available in the document. In certain embodiments, the documents in the corpus are partitioned using natural language processing (NLP). In these embodiments, the resulting partitions maintain hierarchical information that is inherent to their associated documents. The method by which the documents in the corpus are partitioned is a matter of design choice, and may include various document partitioning approaches known to those of skill in the art.

The partition hierarchy information associated with the documents is then processed in step 508 to generate a directed graph. As used herein, a directed graph refers to a graph, or set of nodes connected by edges, where the edges have a direction associated with them. Each edge of the directed graph is then associated with a predetermined weight and type in step 510, as described in greater detail herein. In one embodiment, a predetermined conceptual distance weight value is associated with each edge of the directed graph that is shared by a parent section and a sub-section. In another embodiment, a predetermined conceptual distance weight value is associated with each edge of the directed graph that is shared by a predetermined section in a first document and a predetermined section in a second document. In yet another embodiment, a predetermined conceptual distance weight value is associated with each edge of the directed graph that is shared by sub-sections in a document that share the same parent section. Skilled practitioners of the art will realize that many such embodiments are possible and the foregoing is not intended to limit the spirit, scope or intent of the invention.

The corpus of documents is then searched for passages in step 512. In various embodiments, initial passages are found through the implementation of search indexes familiar to those of skill in the art. In these embodiments, the indexes for each passage may include contextualized information gained through inheritance to improve initial passage search results. In certain embodiments, additional passages are found and weighted, based upon their conceptual distance from the initial passages that were found. In various embodiments, the search results are improved by using the conceptual distance of the additional passages to find passages in other documents.

Alignment and relevance scores are then used, as described in greater detail herein, to score the passages in step 514, based upon a predetermined question and its corresponding answer. In certain embodiments, the alignment and relevance scores for small child sections are improved through the use of inherited information resulting from the various conceptual distance operations described in greater detail herein. Conceptual distance preservation operations are then ended in step 516.

Although the present invention has been described in detail, it should be understood that various changes, substitutions and alterations can be made hereto without departing from the spirit and scope of the invention as defined by the appended claims.

What is claimed is:

1. A system comprising:
a processor;
a data bus coupled to the processor; and
a computer-usable medium embodying computer program code, the computer-usable medium being coupled to the data bus, the computer program code used for characterizing content of documents by conceptual relationships and comprising instructions executable by the processor and configured for:
applying natural language processing (NLP) to content in a plurality of documents to identify topics and subjects;
applying analytic analysis to the topics and subjects to identify a conceptual relationship of the content in the plurality of documents;
partitioning the content in each of the plurality of documents into a first structured hierarchy, preserving at least one structure in each document inherent in the each document; and
providing access to content through a first index based upon utilizing the first structured hierarchy and through a second index utilizing a second structured hierarchy; and wherein
the content is characterized by optimizing a vector space model representation of the documents, the optimization performed by a system capable of answering questions, where:
the content from the plurality of documents is ingested by the system;
natural language processing is applied to the content in the plurality of documents to identify terms, topics, subjects and concepts;
the content is partitioned according to a semantic parse distance to identify a context for partitioned content;
the content and context is represented, by the system, utilizing a vector space model;
entries in the vector space model are eliminated based on a difference criteria; and
an iterative genetic algorithm is applied to optimize features of the vector space model.

2. The system of claim 1, wherein:
the conceptual relationship is based upon a directed graph with weights based upon a similarity and a distance based upon concepts.

3. The system of claim 1, wherein:
the distance is based upon a topic hierarchy.

4. The system of claim 1, wherein:
a ground truth is an optimized feature.

5. The system of claim 4, wherein:
the genetic algorithm determines which features are used during the ingesting and has weighting based on semantic distance.

6. A non-transitory, computer-readable storage medium embodying computer program code, the computer program code comprising computer executable instructions configured for:
applying natural language processing (NLP) to content in a plurality of documents to identify topics and subjects;

applying analytic analysis to the topics and subjects to identify a conceptual relationship of the content in the plurality of documents;

partitioning the content in each of the plurality of documents into a first structured hierarchy, preserving at least one structure in each document inherent in the each document; and providing access to content through a first index based upon utilizing the first structured hierarchy and through a second index utilizing a second structured hierarchy; and wherein the content is characterized by optimizing a vector space model representation of the documents, the optimization performed by a system capable of answering questions, where:

the content from the plurality of documents is ingested by the system;

natural language processing is applied to the content in the plurality of documents to identify terms, topics, subjects and concepts;

the content is partitioned according to a semantic parse distance to identify a context for partitioned content;

the content and context is represented, by the system, utilizing a vector space model;

entries in the vector space model are eliminated based on a difference criteria; and an iterative genetic algorithm is applied to optimize features of the vector space model.

7. The non-transitory, computer-readable storage medium of claim 6, wherein:

the conceptual relationship is based upon a directed graph with weights based upon a similarity and a distance based upon concepts.

8. The non-transitory, computer-readable storage medium of claim 6, wherein:

the distance is based upon a topic hierarchy.

9. The non-transitory, computer-readable storage medium of claim 6, wherein:

a ground truth is an optimized feature.

10. The non-transitory, computer-readable storage medium of claim 9, wherein:

the genetic algorithm determines which features are used during the ingesting and has weighting based on semantic distance.

11. The non-transitory, computer-readable storage medium of claim 6, wherein the computer executable instructions are deployable to a client system from a server system at a remote location.

12. The non-transitory, computer-readable storage medium of claim 6, wherein the computer executable instructions are provided by a service provider to a user on an on-demand basis.

* * * * *